United States Patent

Shah et al.

Patent Number: 5,339,667
Date of Patent: Aug. 23, 1994

[54] METHOD FOR PINCH FREE TUBE FORMING

[75] Inventors: Sanjay M. Shah, Rochester Hills; Michael H. Lovell, Leonard, both of Mich.

[73] Assignee: General Motors Corporation, Detroit, Mich.

[21] Appl. No.: 48,016

[22] Filed: Apr. 19, 1993

[51] Int. Cl.⁵ .............................................. B21D 26/02
[52] U.S. Cl. .......................................... 72/58; 72/367; 72/370; 29/421.1
[58] Field of Search .................... 72/56, 57, 58, 61, 62, 72/316, 367, 370; 29/421.1

[56] References Cited

U.S. PATENT DOCUMENTS

| | | | |
|---|---|---|---|
| 4,567,743 | 2/1986 | Cudini | 72/61 |
| 4,744,237 | 5/1988 | Cudini | 72/367 |
| 4,829,803 | 5/1989 | Cudini | 72/367 |
| 5,070,717 | 12/1991 | Boyd et al. | 72/57 |

FOREIGN PATENT DOCUMENTS

| | | | |
|---|---|---|---|
| 0816688 | 10/1951 | Fed. Rep. of Germany | 72/367 |
| 0285713 | 12/1991 | Japan | 72/367 |

OTHER PUBLICATIONS

E. I. Isachenkov, D. Sc., "Molding By Rubber And Liquid", Date 1967.

*Primary Examiner*—Jones David
*Attorney, Agent, or Firm*—Charles E. Leahy

[57] ABSTRACT

A method of forming an elongated box shape tubular frame member from a round tube includes the steps of: providing a lower die member having a cavity submerged substantially below the top surface of the lower die and having a cavity width equal to the width of the desired box shape frame member and less than the diameter of the tube. The lower die has an entry opening which opens to the top surface of the die and is defined by angularly disposed funnel walls which converge to intersect with the cavity. The round tubular blank is placed onto the lower die so that the blank rests on the angularly disposed funnel walls above the cavity. The upper die is lowered onto the lower die and has a lid wall which forces the tubular blank downwardly into the cavity while the angularly disposed funnel walls guide the blank to collapse in a manner preventing pinching of the blank between the upper and lower dies. The application of internal hydraulic pressure then expands the collapsed tube outwardly to the shape defined by the cavity of the lower die and the lid wall of the upper die.

4 Claims, 4 Drawing Sheets

METHOD FOR PINCH FREE TUBE FORMING

BACKGROUND OF THE INVENTION

The invention relates to forming a box shaped frame member using internal hydraulic pressure.

It is known to form the cross-sectional profile of a tubular member by a hydroforming process in which a tubular blank is placed within a die and hydraulic fluid pressure is applied to the interior of the tubular blank to expand the tubular blank into the shape defined by the die cavity. The hydroforming process is particularly useful for transforming a commercially available round tubular shape into an elongated box shape tubular frame member of the type useful in the manufacture of automobile vehicle body and chassis.

The prior art has recognized that the circumferential expansion of the tubular blank is limited to about 2-5% (without significantly thinning the tube) when using readily available commercial grades of tubular steel. Accordingly, the circumferential measure of the tubular blank can be only about 2-5% less than the circumferential measure of the box shape end product so that closing the box shape cavity of the hydroforming dies about the round tubular blank is akin to the proverbial problem of forcing a round peg into a square hole.

Accordingly, it would be desirable to provide an improved hydroforming die and method by which a round tubular blank having a diameter greater than the width of the desired finish product could be forced into the hydroforming die, the die closed, and then hydraulic pressure employed to expand the collapsed tube into the desired box shaped defined by the cavity.

In addition, it would be desirable to provide such a die apparatus of economical manufacture and low maintenance.

According to the invention, a method of forming an elongated box shape tubular frame member from a round tube includes the steps of: providing a lower die member having a cavity submerged substantially below the top surface of the lower die and having a cavity width equal to the width of the desired box shape frame member and less than the diameter of the tube. The lower die has an entry opening which opens to the top surface of the die and is defined by angularly disposed funnel walls which converge to intersect with the cavity. The round tubular blank is placed onto the lower die so that the blank rests on the angularly disposed funnel walls above the cavity. The upper die is lowered onto the lower die and has a lid wall which forces the tubular blank downwardly into the cavity while the angularly disposed funnel walls guide the blank to collapse in a manner preventing pinching of the blank between the upper and lower dies. The application of internal hydraulic pressure then expands the collapsed tube outwardly to the shape defined by the cavity of the lower die and the lid wall of the upper die. The lower die preferably includes rounded corners at the intersection of side walls and a bottom wall to provide rounded corners on the box shape tubular frame member. However, the edge surfaces of the lid wall of the upper die are rounded in the reverse direction away from the side walls of the lower cavity for ease of die manufacture, so that the rounded corners of the box shape tubular frame member are provided by controlling the magnitude of internal hydraulic pressure to a level sufficient to properly expand the tube against the side walls, the bottom wall, the lid wall, and the lower corners, while not so great as to force the upper corners fully into the reverse rounded upper corners of the die cavity.

DESCRIPTION OF THE PREFERRED EMBODIMENT

Figure 1:
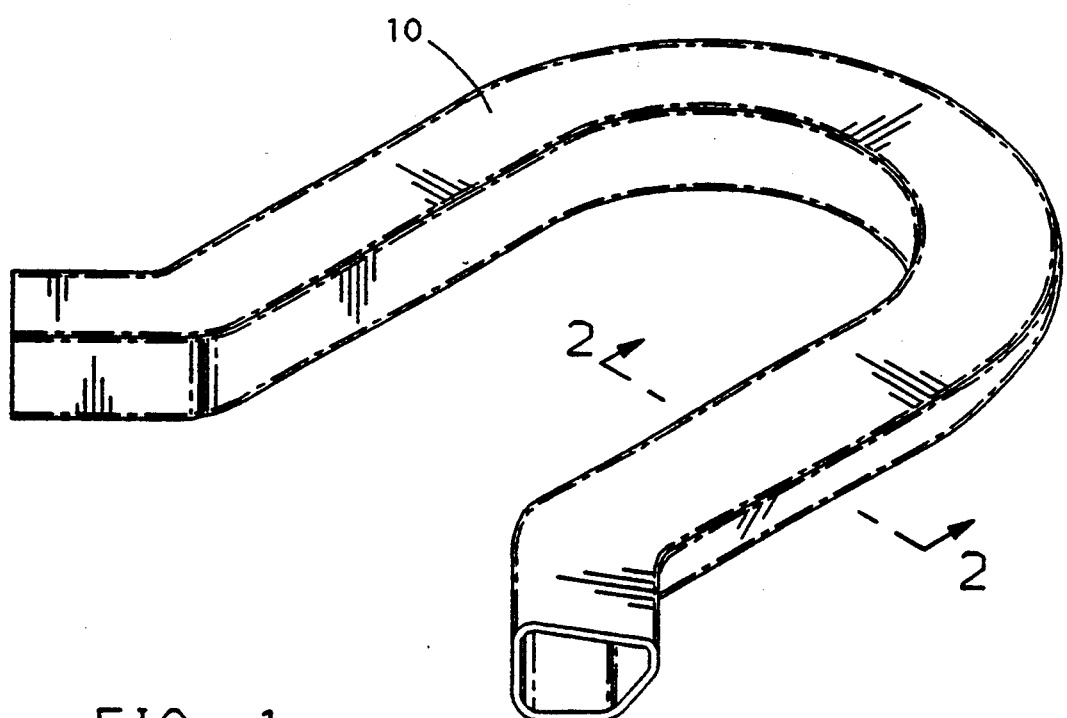
FIG. 1 is a perspective view of a U-shaped engine cradle frame member manufactured according to this invention.

Referring to FIG. 1 there is shown a hydroformed frame member 10 for a motor vehicle. The frame member 10 is generally U-shaped and has a cross-sectional profile shown in FIG. 2.

Figure 2:
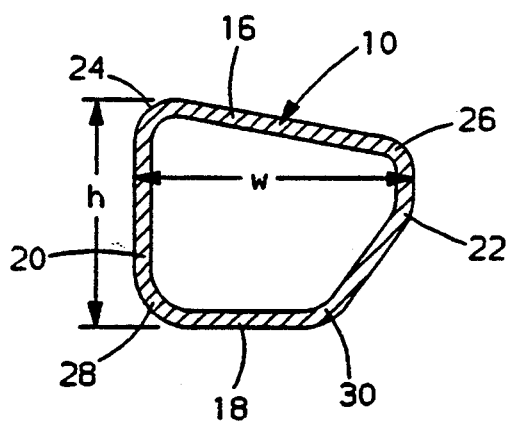
FIG. 2 is a sectional view taken through the engine cradle showing the generally box shaped profile of the hydroformed frame member.

As seen in FIG. 2, the frame member 10 includes a top wall 16 and a bottom wall 18 connected together by spaced apart side walls 20 and 22.

The top 16 is connected to the side walls 20 and 22 by rounded corners 24 and 26. The bottom wall 18 is connected to side walls 21 and 22 by rounded corners 28 and 30. The cross section of FIG. 2 has an overall width designated "w" and a depth designated "h". "Thus the box shape or frame member 10 is a quadrilateral tubular cross sectional shape, such as a conventional square, rectangular, or a more irregular quadrilateral polygon shape such as the cross section of FIG. 2. The quadrilateral shape provides flat surfaces so that weldments and brackets may be welded to flat surfaces instead of the round surfaces provided by rounded or elliptical cross sections."

Figure 3:
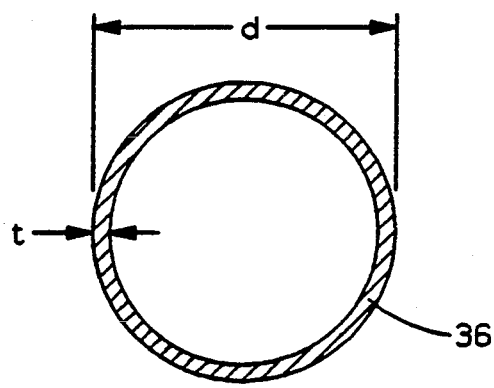
FIG. 3 is a cross section through the round tubular blank from which the frame member of FIG. 1 is to be manufactured.

FIG. 3 shows a round tubular blank 36 from which the frame member 10 is to be manufactured. The round tubular blank 36 has a diameter designated "d" and a wall thickness "t". In comparing the round blank 36 of FIG. 3 with the hydroformed member of FIG. 2, it will be appreciated that the diameter "d" of the tubular blank 36 is greater than the width "w" of the frame member 10. The circumference of the cross section at FIG. 2 is about 5% greater than the circumference of the tubular blank 36 of FIG. 3 as will be discussed further hereinafter. The round tubular blank 36 is bent to the general U-shape of FIG. 1 using conventional tube bending techniques.

Figure 4:
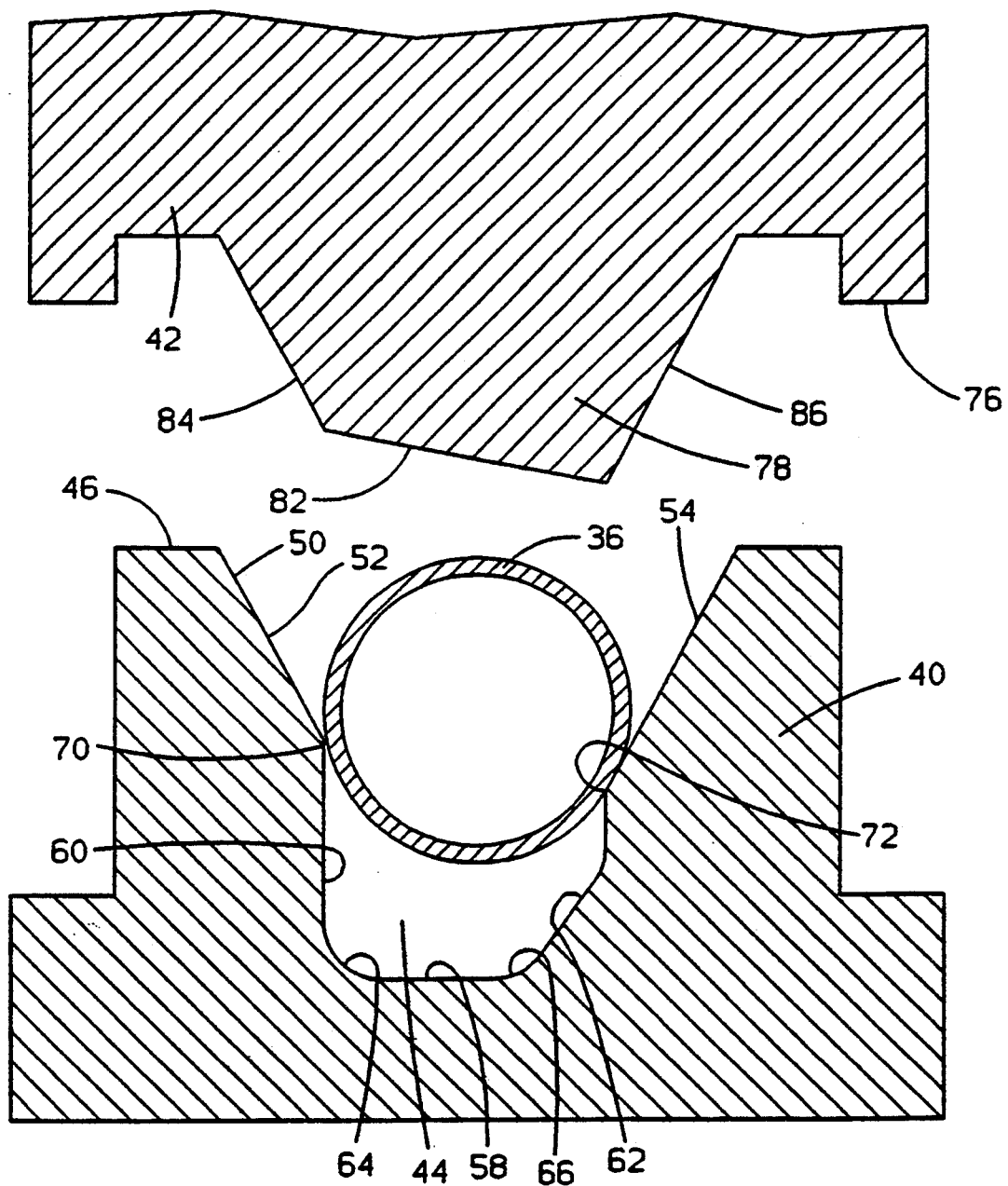
FIG. 4 is a cross-sectional view taken through the die showing the upper die in an opened position relative the lower die and showing the round tubular blank of FIG. 3 resting on the lower die.

Referring to FIG. 4, it is seen that the lower hydroforming die 40 has forming cavity 44 which extends longitudinally along the length of the die 40 and is submerged within the die 40 below the top surface 46 of the die. The forming cavity 44 opens upwardly to the top surface 46 by angularly disposed funnel walls 52 and 54 defining an entry opening 50. The forming cavity 44 includes a bottom wall 58 and side walls 60 and 62. A concave rounded corner 64 smoothly joins the bottom wall 58 and side wall 60. Likewise, a concave rounded corner 66 smoothly joins the bottom wall 58 with the side wall 62. The side walls 60 and 62 are angled away from one another by about one degree to facilitate the eventual removal of a hydroformed tube from the die cavity 44. Thus, as seen in FIG. 4, the overall depth of the cavity in the lower die is greater than the desired height of the frame member and includes a lower most forming cavity portion 44 and an uppermost entry cavity portion defined by the angularly disposed funnel walls 52 and 54 of the entry opening 50.

As seen in FIG. 4, the side wall 60 of the forming cavity 44 intersects the funnel wall 52 at an apex 70. Likewise the side walls 62 of the forming cavity intersects with the funnel wall 54 at an apex 72.

FIG. 4 also shows a tubular blank 36 having been placed in the entry opening 50 of the lower die 40. Because the diameter "d" of the tubular blank 36 is greater than the width "w" of the forming cavity 44 and the cross section of FIG. 2, the tube rests within the entry opening 50 and is supported on the funnel walls 52 and 54 generally at the apex points 70 and 72.

FIG. 4 also shows the upper die 42 which has a bottom face 76 and a ram 78 which extends longitudinally along the lower face 76 of the die and projects downwardly therefrom in registry with the entry opening 50 of lower die 40. The ram 78 includes a lid wall 82 and angularly disposed ram walls 84 and 86.

Figure 5:
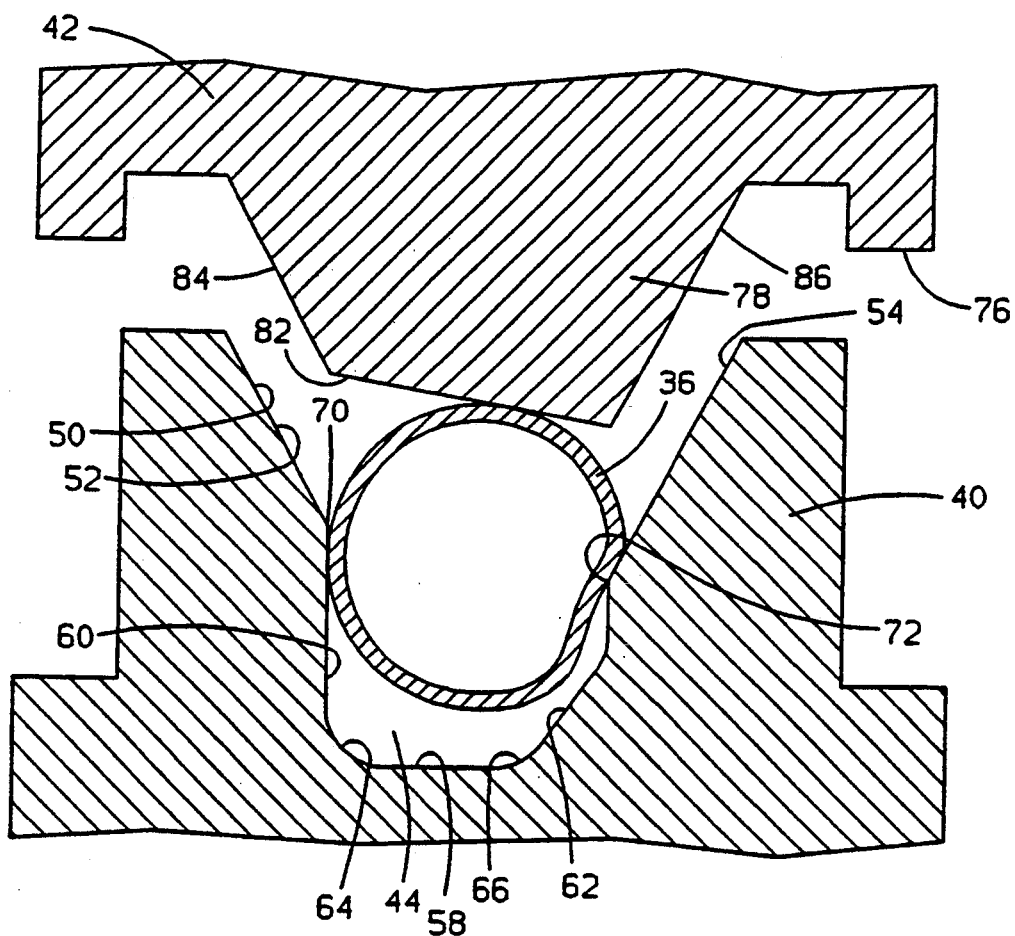
FIG. 5 shows the upper die being lowered toward a closed position relative the lower die and forcing the round tubular blank into a box shape cavity in the lower die.

FIG. 5 shows the upper die 42 being closed upon the lower die 40. As seen in FIG. 5, the lid wall 82 of the upper die 42 has moved down into engagement with the top the tubular blank 36 and is forcing the tubular blank 36 downwardly into the cavity 44. During this lowering of the lid wall 82, the angularly converging funnel walls 52 and 54 work to shoehorn the diameter "d" of the tubular blank 36 into the lesser width "w" of the forming cavity 44.

Figure 6:
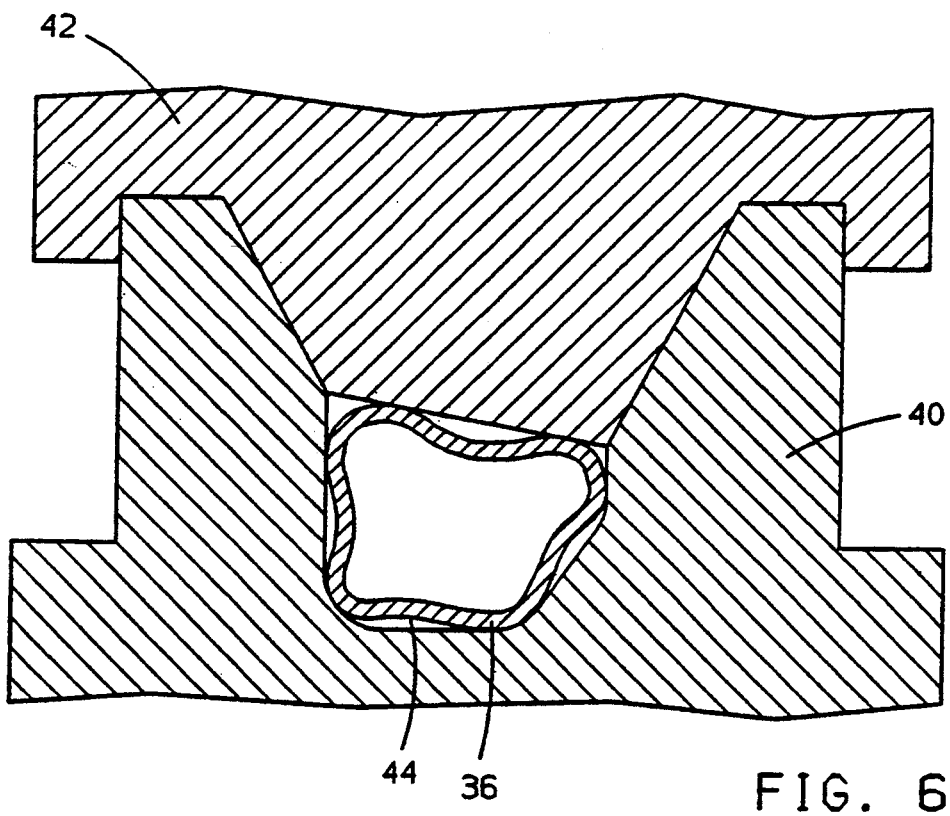
FIG. 6 is a cross section taken through the die showing the upper die having been fully closed.

FIG. 6 shows the upper die 42 fully lowered upon the lower die 40 so that the blank 36 has been completely forced into the lower cavity 44 without any pinching of the tube 10 between the upper and lower dies.

The lid wall 82 of the upper die 42 cooperates with the bottom wall 58 and side walls 60 and 62 of the lower die 40 to define the box shape in which the tube 36 is captured. As seen in FIG. 6, the round tube 36 has been somewhat crushed and collapsed in an inward irregular manner during its forced placement into the box shape cavity of the lower die 40.

Figure 7:
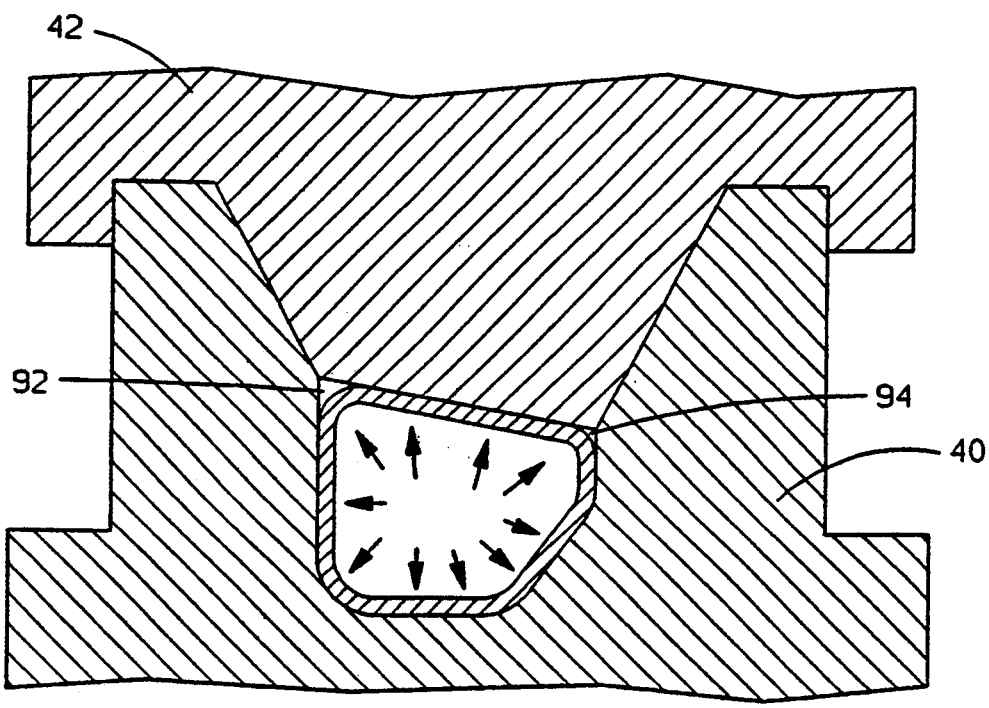
FIG. 7 is a view similar to FIG. 6 but showing the frame member after the application of internal hydraulic pressure has expanded the tube to its final cross section of FIG. 2.

FIG. 7 shows the application of hydraulic pressure to the interior of the blank 36 to force the blank outwardly to its final shape of FIG. 2. During this outward expansion, the circumference of the blank 36 is expanded about five percent beyond the circumference of the original tubular blank 36. The application of the internal hydraulic pressure forces the bottom wall 18 and the side walls 20 and 22 into engagement with the corresponding bottom and side walls 58, 60, and 62 of the lower die 40. Likewise, the hydraulic pressure forces the tube wall to form the rounded corners 28 and 30 by forcing the blank 36 into the rounded corners 64 and 66 of the lower die.

Figure 8:
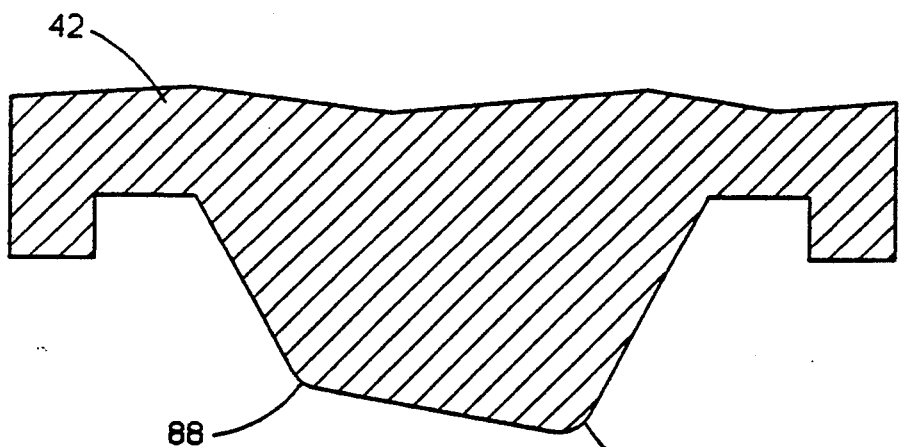
FIG. 8 is an enlarged fragmentary view of the upper die.

As best seen in FIG. 7, the top wall 16 is expanded upwardly into engagement with the lid wall 82 of the upper wall 42. FIGS. 7 and 8 show the preferred arrangement of the upper die 42 in which the corners of the die at the intersection of the lid wall 82 and ram walls 84 and 86 are connected by smoothly rounded corners 88 and 90. These rounded corners 88 and 90 are desirable for ease of manufacture and maintenance of the upper die 42. However, as shown in FIG. 7, corner voids 92 and 94 remain even after the tube has been fully expanded to the finished shape.

Accordingly, it will be appreciated the rounded upper corners 24 and 26 of the frame member 10 are provided by the resistance of the tube to expansion, rather than the forced expansion of the tube into the void spaces 92 and 94. This rounding of the upper corners 24 and 26 is thus provided by using a internal forming hydraulic pressure which is great enough to forcibly expand the blank fully into contact with the walls of the lower cavity, and yet not so great as to expand the tube into the void spaces 92 and 94.

Figure 9:
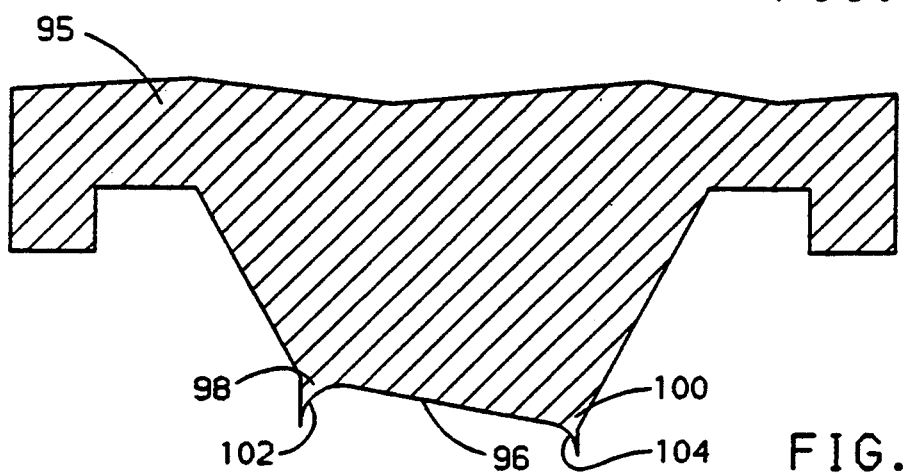
FIG. 9 is a view similar to FIG. 8 but showing an alternative construction of the upper die.

FIG. 8 shows and enlarged view of the preferred upper die 42 and is seen to have convexly curved rounded corners 88 and 90 which are easy to manufacture and maintain. In contrast, FIG. 9 shows an alternative upper die 95 in which a lower surface of the die 96 has pointed corners 98 and 100 which will project into the void space 92 and 94 shown in FIG. 7. Accordingly, using the upper die 95 of FIG. 9, the final hydroformed shape of the tube would be obtained by expanding the tube into contact with the upper wall 96 while the contact of the tube with the concave curves 102 and 104 of the upper die pointed corners 98 and 100 will form the rounded corners 24 and 26 of the frame member.

In comparing FIGS. 8 and 9 it will be appreciated that the die shape of FIG. 8 will be substantially easier to manufacture and maintain than would be the more complex die shape of FIG. 9.

Thus it is seen that the invention provides a new and improved hydroforming method and die apparatus particularly suited to forming tubular members having a width which is less than the overall width of the diameter of the tubular blank from which the frame member is to be hydroformed.

In addition, the invention provides a new and improved hydroforming die apparatus particularly suited for hydroforming tubular blanks which have been bent to a U-shape or other shape approximating the shape of the desired final product. In particular, as best seen in FIG. 4, the tubular blank 36 form making the U-shaped frame member 10 of FIG. 1 has been bent to a U-shape precisely to overlie the forming cavity 44 so that the circumference of the tubular blank 36 rests upon the lower die at the apex points 70 and 72. However, in conventional tube bending techniques some variation will exist and the tubular blank 36 may align with forming cavity 44 in a less precise alignment so that at various points along the length of the tube the tubular blank may rest upon any one or more of the funnel walls 52 or 54, or the apex points 70 and 72. In any case, the angled funnel walls 52 will function to guide the tubular blank 36 into its proper alignment with the forming cavity 44 during the lowering of the upper die 42 onto the tube.

In addition, although the funnel walls 52 and 54 will guide the tube into the forming cavity 44 in a pinch-free manner, it may nonetheless be desirable to prefill the tube 36 with fluid at a certain level of pressure (perhaps 100–1000 psi) so that the hydraulic fluid will resist a severe collapse of the tube 36 as might occur when the upper die 42 reaches its fully closed position of FIG. 6.

It will also be understood that the invention is not limited to an upper die having a ram with no cavity. For example, the flat lid wall 82 of FIG. 4 can be machined to define a concave recess when appropriate to the shape of the desired final product.

The embodiments of the invention in which an exclusive property or privilege is claimed are defined as follows:

1. A method of forming an elongated quadrilateral box shape tubular frame member from a round tube, having a diameter greater than the width or the desired frame member comprising the steps of:

providing upper and lower dies having open positions to permit the placement of the round tube therebetween and closed positions defining therebetween the approximate quadrilateral cross sectional shape of the desired frame member, said lower die having a die cavity with an overall depth greater than the desired height of the frame member, and including a lowermost forming cavity portion of width equal to the width of the desired frame member and depth equal to the depth of the desired frame member, and an uppermost entry cavity portion having walls spaced at a width greater than the width of the desired frame member and converging angularly to the width of the lowermost forming cavity portion so that the walls defining the uppermost cavity portion are engageable by the round tube during the lowering of the upper die onto the lower die and supportably guide the collapse of the round tube as the round tube is forced into the lowermost cavity, and applying internal pressure to the tube with the dies in the closed position to cause the expansion of the tube to the cross sectional shape defined between the dies.

2. A method of forming a longitudinally elongated quadrilateral box shape tubular frame member from a round tubular blank having a diameter greater than the width of the desired frame member, comprising the steps of:

providing a lower die having a longitudinal extending cavity submerged below a top surface of the die and an entry opening which opens to the top surface of the die in order to permit a tubular blank to be placed into the cavity, said entry opening being defined by angularly disposed walls which converge to intersect with the cavity, placing a round tubular blank of diameter greater than the width of the lower die cavity into the entry opening of the lower die so that the blank rests on the lower die above the cavity, lowering an upper die onto the lower die, said upper die having a lid wall which upon complete lowering of the upper die onto the lower die cooperates with the cavity of the lower die to define a longitudinally extending box shape closed forming cavity, said lid wall engaging with the blank upon the lowering of the upper die so that the lid wall forces the blank into the cavity of the lower die and the angularly disposed walls of the lower die guides the blank into the cavity in a manner which prevents pinching of the blank between the upper and lower dies, and applying internal hydraulic pressure to the blank to forcibly expand the blank outwardly to form a box shape member defined by the box shape forming cavity.

3. A method of forming a longitudinally elongated box shape tubular frame member having top, bottom and side walls connected by rounded corners from a round tube having a diameter greater than the width of the desired frame member, comprising the steps of:

providing a lower die having a longitudinal extending cavity submerged below the top surface of the die and having cavity side walls connected to a cavity bottom wall by rounded corners, said lower die having a top opening which opens to the top surface of the die in order to permit a tubular blank to be entered into the cavity, said top opening being defined by angularly disposed die walls which converge to intersect with the cavity, placing a round tubular blank of diameter greater than the width of the lower die cavity into the opening of the lower die so that the blank rests on the lower die above the cavity, lowering an upper die onto the lower die, said upper die having a lid wall which upon complete lowering of the upper die onto the lower die defines a top wall of a box shape and intersects with the cavity side walls of the lower die cavity at a sharp corner leaving a void between the forming cavity defined between the upper and lower dies and the desired rounded corner shape of the desired frame member, said lid wall engaging with the blank upon the lowering of the upper die so that the lid wall forces the blank into the cavity and the angularly disposed walls of the lower die guides the blank into the cavity in a manner which prevents pinching of the blank between the upper and lower dies, and applying internal hydraulic pressure to the blank to forcibly expand the blank outwardly to form a box shape by the forced expansion of the tube into contact with the walls of the upper and lower die and provide rounded corners between the top wall and the side walls by the resistance of the tube to expansion into the sharp corner void between the side walls of the lower die cavity and the lid wall.

4. The method of claim 3 further characterized by applying internal hydraulic pressure at a pressure level which is great enough to forcibly expand the blank fully into contact with the walls of the lower cavity, and yet not so great as to expand the tube into the void space.

* * * * *